Patented Apr. 19, 1938

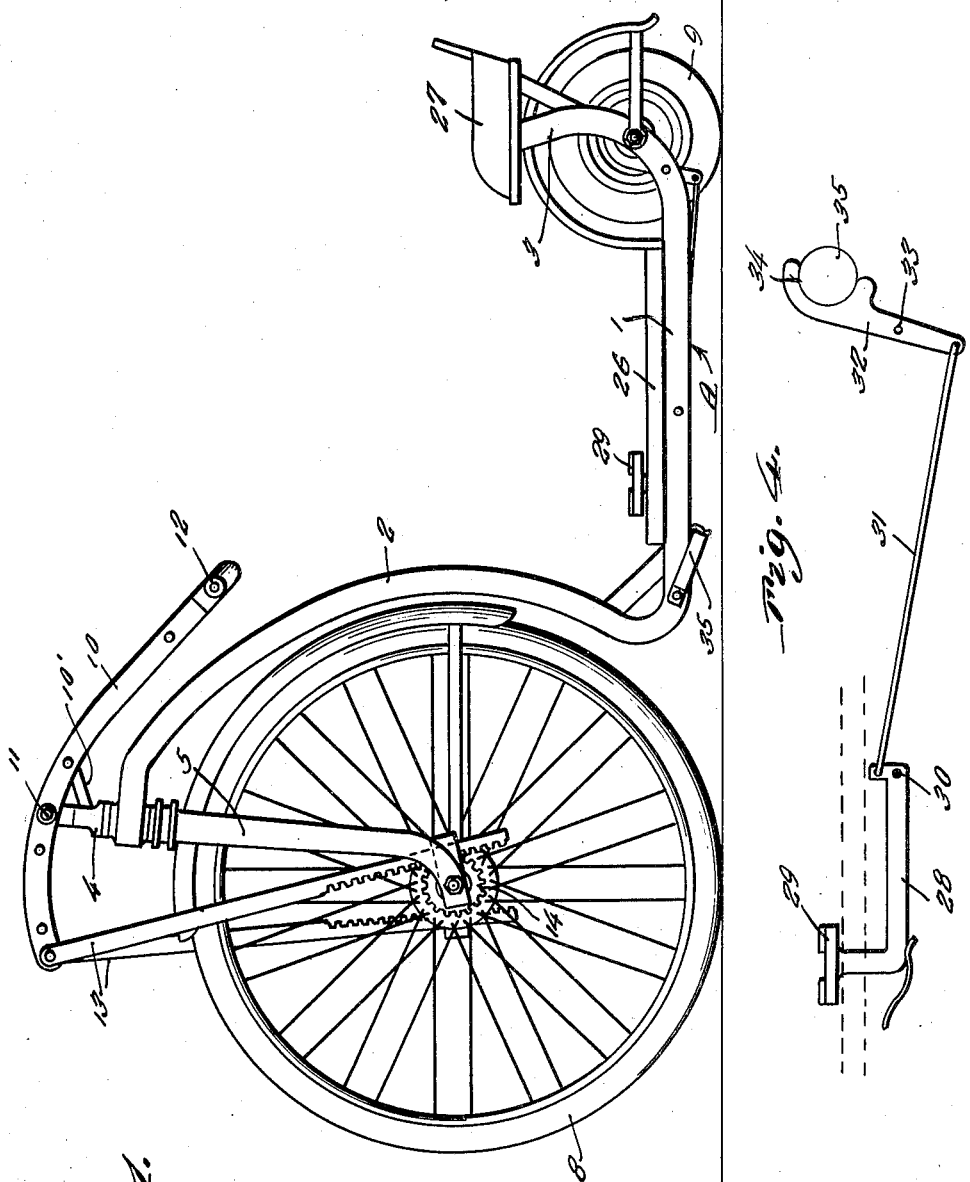

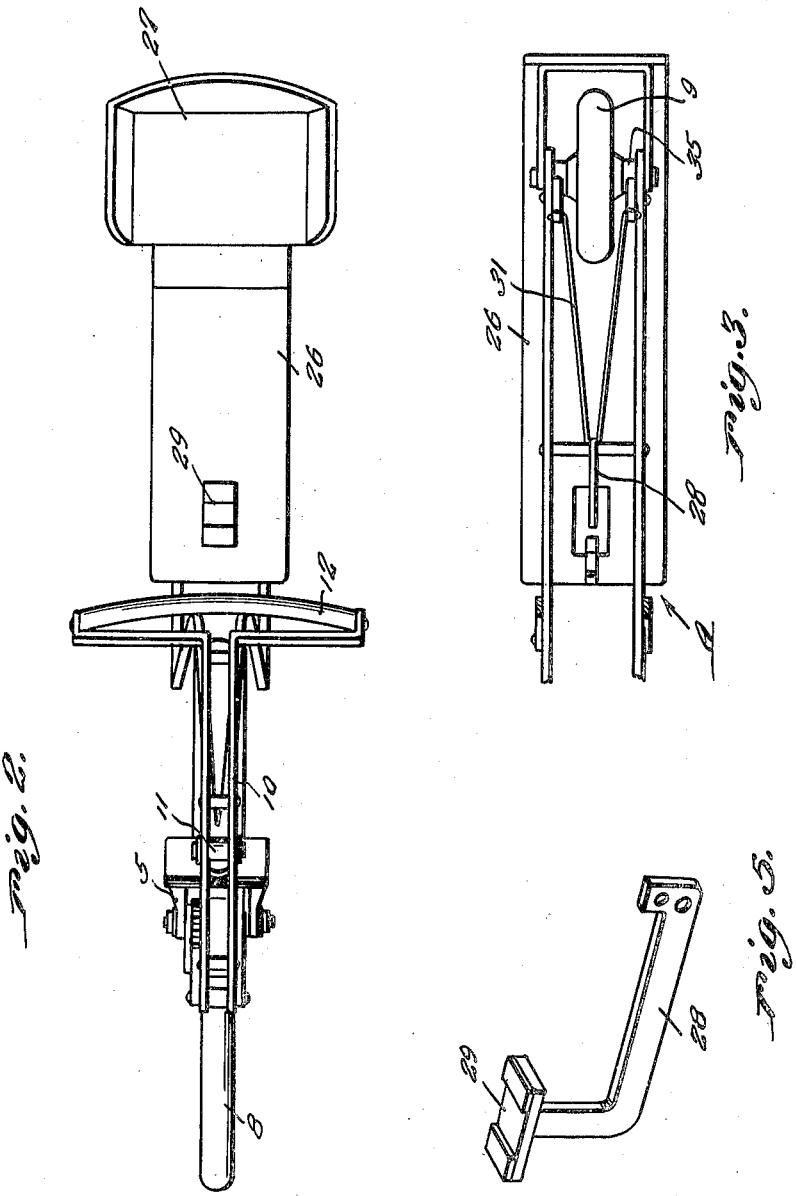

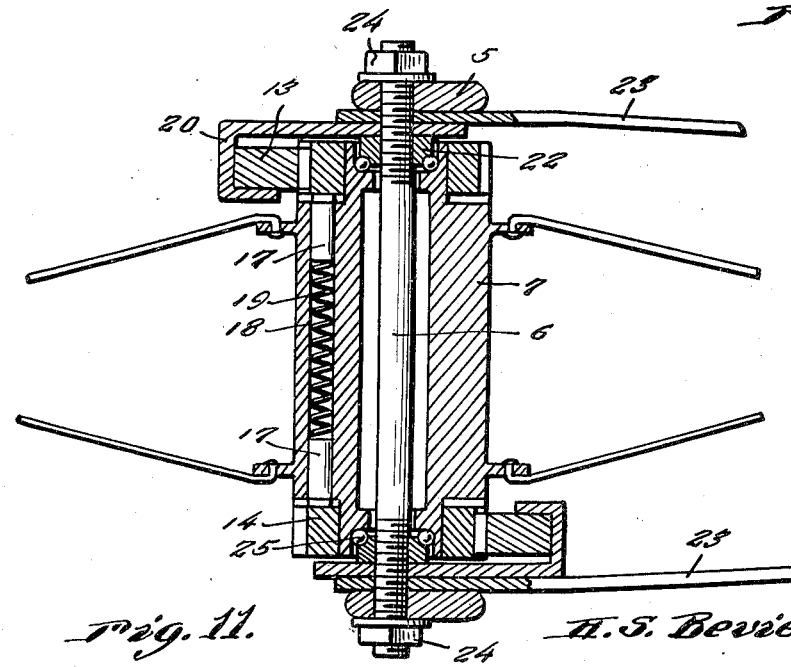

2,114,648

UNITED STATES PATENT OFFICE 2,114,648

MANUALLY ACTUATED VEHICLE

Horace S. Bevier, Paducah, Ky.

Application September 16, 1937, Serial No. 164,256

1 Claim. (Cl. 280—240)

This invention relates to a vehicle of the bicycle or tricycle type, the general object of the invention being to provide means whereby the vehicle can be propelled by oscillation of a hand lever and with means whereby certain movements of said lever can be used for steering the vehicle.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of the invention.

Figure 2 is a top plan view thereof.

Figure 3 is a bottom plan view of the body part of the vehicle.

Figure 4 is an elevation of the brake means.

Figure 5 is a view of the brake pedal.

Figure 6 is an end view of the hub of the front wheel.

Figure 7 is a view of the ratchet wheel.

Figure 8 is a perspective view of the guide member for a rack bar.

Figure 9 is a detail sectional view showing how a dog engages a ratchet wheel.

Figure 10 is a view of one of the dogs.

Figure 11 is a sectional view through the hub of the front wheel and the supporting and actuating means therefor.

The drawings show the invention as provided with a single rear wheel but it is to be understood that the device can be equipped with two rear wheels so that it will support itself in upright position.

In these drawings, the frame A includes the substantially horizontal intermediate part 1, the upwardly and forwardly curving front part 2 and the upwardly extending rear part 3. The upper end of the front part rotatably supports the shank 4 of the fork 5, the prongs of which support the shaft or axle 6 of the hub 7 of the front wheel 8, in the usual manner. A rear wheel 9 is suitably supported for rotary movement at the rear of the frame and, as before stated, while the drawings show but one rear wheel, it is to be understood that two rear wheels can be used to make the device self-supporting.

A hand lever 10 is pivotally connected intermediate its ends with the upper end of the shank or standard 4, as shown at 11 and the rear end of said lever is provided with the elongated arcuate shaped hand grip 12 and its front end is pivotally connected with the pair of rack bars 13. A ratchet wheel 14 is rotatably arranged on each end of the hub 7 and each wheel is formed with the circumferential teeth 15 for engagement by the rack teeth of a bar 13 and each wheel has the ratchet teeth 16 on its inner side face for engagement by a dog or pawl 17. These pawls or dogs are arranged in a longitudinally extending bore or passage 18 formed eccentrically in the hub 7 and the dogs are pressed outwardly by a spring 19 placed in said passage. One bar 13 extends in front of the hub and engages one of the wheels 14 and the other extends in rear of the hub and engages the opposite ratchet wheel and the parts are so arranged that when the bars are moving downwardly one of the wheels 14 is connected with the hub by its dog 17 so that the hub and wheel are caused to rotate with the toothed wheel 13. During this motion the other wheel 14 simply ratchets over its dog. However, on the upward movement of the bar 13 the last-mentioned wheel 14 is connected with the hub by its dog and the first wheel ratchets. Thus on both movements of the hand lever motion thereof is communicated to the front wheel of the vehicle.

A hook-shaped guide 20 is provided for each rack bar 13, these guides having holes 21 therein through which the shaft 6 passes and these guides are held between the ball races 22 and the braces 23, the outer faces of which are engaged by the prongs of the fork 5, the parts being held together by the nuts 24 threaded on the ends of the shaft 6. The races 22 are also threaded on the shaft 6 and the ball bearings 25 are placed between these races and flanges at the ends of the hub 7.

A platform 26 is supported on the intermediate part 1 of the frame and a seat 27 is supported on the upper end of the rear part of the frame, though if desired a seat can be placed on the platform, in such a position that the operator can sit on this seat while he operates the lever 10. As the parts are now shown the operator stands on the platform while operating the lever.

A brake pedal 28 has a part passing through a hole in the platform with the upper end of this part having a pad portion 29 thereon. A portion of the pedal extends rearwardly and is pivoted at 30 to a part of the frame and a link 31 extends from a portion of the rear end of the pedal above the pivotal point and engages the lower end of a brake member 32 pivoted as at 33 to a part of the frame. The upper end of the brake member has an arcuate recess 34 therein for engaging a brake part 35 on the axle of the rear wheel 9. The drawings show a pair of these brake members 32, each of which is connected by a link 31 to the brake pedal 28 and the brake members engage the parts 35 at opposite sides of the wheel. As will be seen, by stepping upon the part 29 the pedal will be caused to move the brake members into engagement with the parts 35 and thus check movement of the rear wheel which will, of course, act to brake the movement of the vehicle.

From the foregoing it will be seen that oscillatory movement of the lever 10 will be transmitted as rotary movement to the front wheel by the rack means shown and both movements of the lever are communicated to the wheel. It will also be seen that this lever can be used for steering the vehicle since by moving it laterally the fork 5 will be turned for turning the wheel so that the vehicle can be guided as well as propelled by the lever.

A stop 10' is provided for the hand lever 10 for limiting downward movement thereof, and the usual swinging bracket 35 is attached to the frame part 1 to hold the same in position with the front wheel off the ground.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:—

In a vehicle of the class described, a frame, a post supported for rotary movement in the frame, a wheel carried by the post, a hand lever pivoted intermediate its ends to the front end of the post, a pair of rack bars pivotally connected with the front end of the lever and extending downwardly one in front and one in rear of the hub of the wheel, a toothed wheel rotatably supported at each end of the hub of the front wheel and the teeth of one of which is engaged by one rack bar and the teeth of the other one of which is engaged by the other rack bar, oppositely arranged dogs slidably supported in the hub and the inner side faces of the toothed wheels having ratchet teeth therein for engagement by the dogs, and spring means for forcing the dogs outwardly into engagement with the teeth.

HORACE S. BEVIER.